(12) United States Patent
Liu et al.

(10) Patent No.: US 7,849,069 B2
(45) Date of Patent: Dec. 7, 2010

(54) METHOD AND SYSTEM FOR FEDERATED RESOURCE DISCOVERY SERVICE IN DISTRIBUTED SYSTEMS

(75) Inventors: Zhen Liu, Tarrytown, NY (US); Hao Yang, Ossining, NY (US); Fan Ye, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/471,981

(22) Filed: Jun. 21, 2006

(65) Prior Publication Data

US 2007/0299804 A1 Dec. 27, 2007

(51) Int. Cl.
*G06F 17/30* (2006.01)
(52) U.S. Cl. .................. 707/707; 707/764; 709/203; 709/211; 709/239
(58) Field of Classification Search .............. 707/707, 707/764
See application file for complete search history.

(56) References Cited

U.S. PATENT DOCUMENTS

| | | | |
|---|---|---|---|
| 6,081,898 A | 6/2000 | Miller et al. | |
| 6,185,567 B1* | 2/2001 | Ratnaraj et al. | 707/10 |
| 6,256,634 B1* | 7/2001 | Moshaiov et al. | 707/100 |
| 6,360,230 B1 | 3/2002 | Chan et al. | |
| 6,517,587 B2* | 2/2003 | Satyavolu et al. | 715/234 |
| 6,587,874 B1* | 7/2003 | Golla et al. | 709/220 |
| 6,647,393 B1 | 11/2003 | Dietterich | |
| 2002/0129127 A1* | 9/2002 | Romero et al. | 709/220 |
| 2002/0161855 A1* | 10/2002 | Manczak et al. | 709/219 |
| 2003/0004931 A1* | 1/2003 | Soetarman et al. | 707/3 |
| 2003/0172371 A1* | 9/2003 | Offenmuller | 717/120 |
| 2004/0254917 A1* | 12/2004 | Brill et al. | 707/3 |

OTHER PUBLICATIONS

Paul Mockapetris, Kevin Dunlap, Development of the Domain Name System, 1988, pp. 123-133, Proceedings of SIGCOMM'88, Stanford, CA.
M. Wahl, T. Howes, S. Kille, RFC 2251-Lightweight Directory Access Protocol(v3), Dec. 1997.
L. Peterson, T. Anderson, D. Culler, T. Roscoe, A Blueprint for Introducing Disruptive Technology into the Internet, Jul. 2002, Princeton, NJ.
D. Oppenheimer, J. Albrecht, D. Patterson, A. Vahdat, Distributed Resource Discovery on PlanetLab with SWORD, First Workshop on Real. Large Distributed Systems, Dec. 2004.

(Continued)

*Primary Examiner*—Neveen Abel Jalil
*Assistant Examiner*—Son T Hoang
(74) *Attorney, Agent, or Firm*—George Willinghan; August Law, LLC

(57) ABSTRACT

Resources disposed within a plurality of distributed and autonomous computing systems, each of which may have its own legacy resource discovery service, are identified and allocated. Resource identification servers disposed within each one of the distributed computing systems communicate resource attribute data to a tree hierarchy of dedicated servers. The resource attribute data are maintained in native formats within the distributed computing systems and are mapped to a common format provided by the dedicated servers. The resource attribute data are aggregated at each node within the tree hierarchy, communicated up through the tree hierarchy to one or more root nodes and replicated down through all of the nodes. Additional system robustness is provided through period resource checks and resource attribute data updates. Resource allocation queries are submitted to any level node within the hierarchy and forwarded to the proper computing system for processing.

18 Claims, 3 Drawing Sheets

OTHER PUBLICATIONS

DW Chadwick,Understanding X.500 The Directory and the Java Naming Directory Interface,Jan. 2001,http://java.sun.com/products/jndi/docs.html.

International Search report in corresponding PCT application No. PCT/US07/70544.

* cited by examiner

METHOD AND SYSTEM FOR FEDERATED RESOURCE DISCOVERY SERVICE IN DISTRIBUTED SYSTEMS

FIELD OF THE INVENTION

The present invention relates to the field of management and administration of information technology systems and in particular to resource discovery and allocation among multiple information technology systems that are under different administrative authority and may already have their own, individual, legacy resource discovery services.

BACKGROUND OF THE INVENTION

Contemporary applications and services will run on multiple computing systems that belong to different organizations and fall under different administrative authorities. In order to execute such applications or services that span multiple computing systems, resources within all the computing systems need to be discovered and allocated for these applications. These resources include computing hardware resources, e.g. central processing unit (CPU) resources, storage capacity, e.g. hard drive size, memory size in physical machines and data collectors or data sensors that collect various types of data such as atmospheric or meteorological data and video or audio data. The available resources can be both static and dynamic resources. For example, the memory size or network adaptor speed of a given machine is usually fixed, but the available memory or bandwidth changes frequently over time.

In order to allocate resources among a variety of contemporaneous resource demands, a repository of available resources from various computing systems belonging to all organizations involved needs to be created and maintained. Creation and maintenance of this repository includes discovering resources that are available for allocation. Resource discovery can locate remote resources subject to the specified requirements of a given resource demand and is widely used in many distributed computing systems for a variety of applications. For example, in grid computing, machines or nodes that possess the required CPU and memory resources to run an application are discovered or identified, and then the application is deployed on those identified machines.

A variety of approaches to resource discovery have been proposed. These proposed approaches include the domain name system (DNS) as described in P. Mockapetris & K. J. Dunlap, *Development of the Domain Name System*, Proceedings of SIGCOMM'88, Stanford, Calif., pp. 123-133 (1988), the lightweight directory access protocol (LDAP/X.500) as described in M. Wahl, T. Howes & S. Kille, *RFC 2251-Lightweight Directory Access Protocol (v3)*, December (1997), ITU-T, Recommendation X.500, January (2001) and D. W. Chadwick, *Understanding X.500—The Directory* (1996), and the java naming and directory interface (JNDI) as described in Sun Microsystems, Java Naming and Directory Interface—JNDI Documentation, http://java.sun.com/products/jndi/docs.html. All of these systems provide directory service to discover resources and are usually used as the "native" resource discovery service for discovering resources within each organization. However, when multiple organizations, each with its own legacy resource discovery service, want to share their resources across organizational boundaries for applications that need to utilize resources from this shared global pool, a federated resources discovery that can find the required resources regardless of the organizations in which these resources reside, is needed. All of these approaches fail to provide for a federated search. First, these previous attempts at resource discovery were arranged mostly for static resources or resources that change quite slowly, for example host name to internet protocol (IP) mapping. Support for dynamic resources that vary frequently, for example on the scale of tens of minutes or less, using these systems is very limited. More importantly, these systems assume the space or universe of available resources is globally organized into a pre-defined tree hierarchy that is managed in a delegated manner. That is, each organization agrees on such a hierarchy and "owns" a portion, typically a sub-branch or a node, of the tree, and each resource belongs to a certain node in the tree hierarchy.

Due to administrative and trust reasons, autonomous systems may have different perceptions on how resources should be organized. Thus a commonly accepted global organization and management of resources for multiple organizations each having its own preferences or legacy definition of how resources should be organized may not exist. In addition, global organization introduces complexity and restrictions into the allocation of resources. For example, it can be difficult to pre-define the resource hierarchy if new types of resources or new organizations are to be added in the future. Basically, systems that already employ different resource discovery services need to collaborate for common tasks, but it is impossible and inconvenient to change the individual, legacy resource discovery services.

One scalable wide-area resource discovery tool (SWORD) is described by David Oppenheimer, Jeannie Albrecht, David Patterson, and Amin Vahdat in *Distributed Resource Discovery on PlanetLab with SWORD*, First Workshop on Real, Large Distributed Systems (WORLDS '04), December 2004. This resource discovery service was created for PlanetLab as described by Larry Peterson, Tom Anderson, David Culler, and Timothy Roscoe in A *Blueprint for Introducing Disruptive Technology into the Internet*, July 2002. The resource discovery tool employed by SWORD utilizes a distributed hash table (DHT) based peer-to-peer network to support multi-dimensional range queries on dynamic resources. One disadvantage of using a peer-to-peer network is that the management of the system is difficult. Peer-to-peer networks are arranged to allow high autonomy of individual nodes, making it quite difficult to facilitate, especially centralized, control and management in the system. In addition, the resource discovery tool in SWORD requires that each individual autonomous system export its complete resource records to the peer-to-peer network, possibly any arbitrary node. This requires that all autonomous systems have high degrees of trust among each other, which can become a problem in reality. Individual autonomous systems may not be willing to expose their original records to an arbitrary node in the outside world.

SUMMARY OF THE INVENTION

Systems and methods in accordance with the present invention utilize a federated architecture for discovering both static and dynamic resources in wide area networks. A plurality of autonomous systems, each having their own and potentially a proprietary resource discovery service, are interconnected and combined into a global unified resource discovery system. A pre-existing globally organized and commonly agreed resource space is not required, and each autonomous system, for example a given organization or domain, can organize its resources autonomously. This flexibility allows each system to operate without the restrictions or complications of any pre-defined global resource hierarchy.

In accordance with one exemplary embodiment of a suitable architecture for resource discovery in accordance with the present invention, a plurality of dedicated servers, referred to as D-servers, are arranged in a hierarchy such as a tree hierarchy. This hierarchy is used to answer user queries about resources. For example, each server is a point or node within this hierarchy and is used to aggregate data from its children in a bottom-up fashion in the hierarchy. Each child is also a server within the hierarchy. One or more servers disposed in each domain or organization containing discoverable resources is in communication with one of the D-servers. Each individual organizational server is referred to as an O-server. In one embodiment, each O-server selects one of the D-servers that are positioned as a leaf node in the hierarchy as its parent. The O-server aggregates its resource records into a summary and periodically forwards the summarized data to its selected parent D-server. Upon receipt of this summarized data from one or more O-servers, each D-server further aggregates the summarized data, for example using a coarser granularity, and forwards the additionally aggregated data further up though the hierarchy to its parents and grandparents. Aggregation and forwarding, with potentially increasing granularity, is repeated at each level of the hierarchy until the root server of the hierarchy receives and aggregates summarized data from all its descendents, i.e. all O-servers and D-servers. Aggregation from the leaf nodes to the root nodes provides each parent node within the hierarchy with an aggregated view of the subtree rooted at that parent, and replication overlay provides each node with a telescopic view of other portions of the hierarchy. By assuring consistency within the hierarchy, minimum overhead can be utilized within a given consistency bound.

Upon receipt of a query, for example at the root node of the hierarchy, the aggregate summarized data are used to identify children servers to the root server within the hierarchy that contain data or information about the location and other attributes of the desired resources. These children servers are identified and the query is forwarded to the children. Each child similarly forwards the query further down through the hierarchy until the query reaches the individual O-servers. The O-servers respond to the query by searching their databases and returning the search results to the user that proposed the query. Taking queries at the root server requires each query to be passed through the entire hierarchical structure, a time and resource consuming process. Query response times are shortened, resources preserved and bottlenecks avoided by replicating the summaries among various servers within the hierarchy. Therefore, queries do not have to be always posited to the root D-server in the hierarchy. For example, each D-server stores its own summarized data and the summarized data from its siblings, and its ancestors' siblings. Upon receiving a query, a given D-server searches the replicated summaries and forwards the query directly to the appropriate D-servers without routing the query through the root D-server.

Systems and methods in accordance with exemplary embodiments of the present invention can answer multi-dimensional queries on both static and dynamic resources located in many autonomous systems. Only summarized data and not the complete resource records are required in each node of the hierarchy, making management of the system much easier and having minimal requirements on whom each autonomous system has to trust.

In accordance with one exemplary embodiment of a method for federated resource discovery in distributed systems in accordance with the present invention, resource attribute data associated with a plurality of resources disposed in a plurality of distributed computing systems is communicated from the distributed computing systems to one or more of a plurality of dedicated servers arranged in accordance with a hierarchy, for example a tree hierarchy. The resource attribute data are sufficient to facilitate identification and allocation of the associated resources disposed within the plurality of distributed computing systems. In one embodiment, the resource attribute data are obtained in a plurality of native attribute formats, and each native attribute format is determined by and associated with one of the distributed computing systems. When the resource attribute data is communicated in this native format, the communicated resource attribute data are mapped from the plurality of native attribute formats to a common attribute format provided by at least one of the plurality of dedicated servers. In one embodiment, a plurality of resource discovery servers are used to obtain the resource attribute data, and each resource discovery server is associated with one of the plurality of distributed computing systems. In order to provide for formatting of data into the common format supported in the hierarchy, the common attribute format is communicated to each one of the resource discovery servers, and at least one of the dedicated servers or one of the resource discovery servers are used to map the communicated resource attribute data from the plurality of native formats to a common attribute format provided by the dedicated servers. This mapping is communicated to one of the dedicated servers in conjunction with the resource attribute data.

In addition to communicating the resource attribute data to the dedicated servers, a sufficient amount of resource attribute data is maintained at any given dedicated server within the hierarchy of dedicated servers to process resource queries and to route those queries through the hierarchy of dedicated servers to a distributed computing system comprising a suitable resource for the query. In one embodiment, the resource attribute data are aggregated at each dedicated server to which the resource attribute data are communicated from the plurality of computing systems. These aggregated data are communicated through one or more intermediate dedicated servers to a root dedicated server of the hierarchy. In addition to aggregating data at the dedicated servers that initially receive the resource attribute data, the resource attribute data can be further aggregated at each one of the intermediate dedicated servers.

In one embodiment, in order to maintain a sufficient amount of resource attribute data at each dedicated server, the resource attribute data and aggregated data maintained at each dedicated server are replicated within the hierarchy at one or more additional dedicated servers within the hierarchy. When the hierarchy of dedicated servers is a tree hierarchy, communicating the resource attribute data involves communicating the resource attribute data from one of the plurality of computing systems to one of a plurality of leaf node dedicated servers within the tree hierarchy. In one embodiment, maintaining the resource attribute data includes periodically updating the resource attribute data maintained in the dedicated servers. Old or expired data are removed form the hierarchy by identifying a time to live value for each resource attribute datum communicated to the dedicated servers, and deleting resource attribute data from the dedicated servers for which updates are not received in compliance with the identified time to live values.

DETAILED DESCRIPTION

Figure 1:
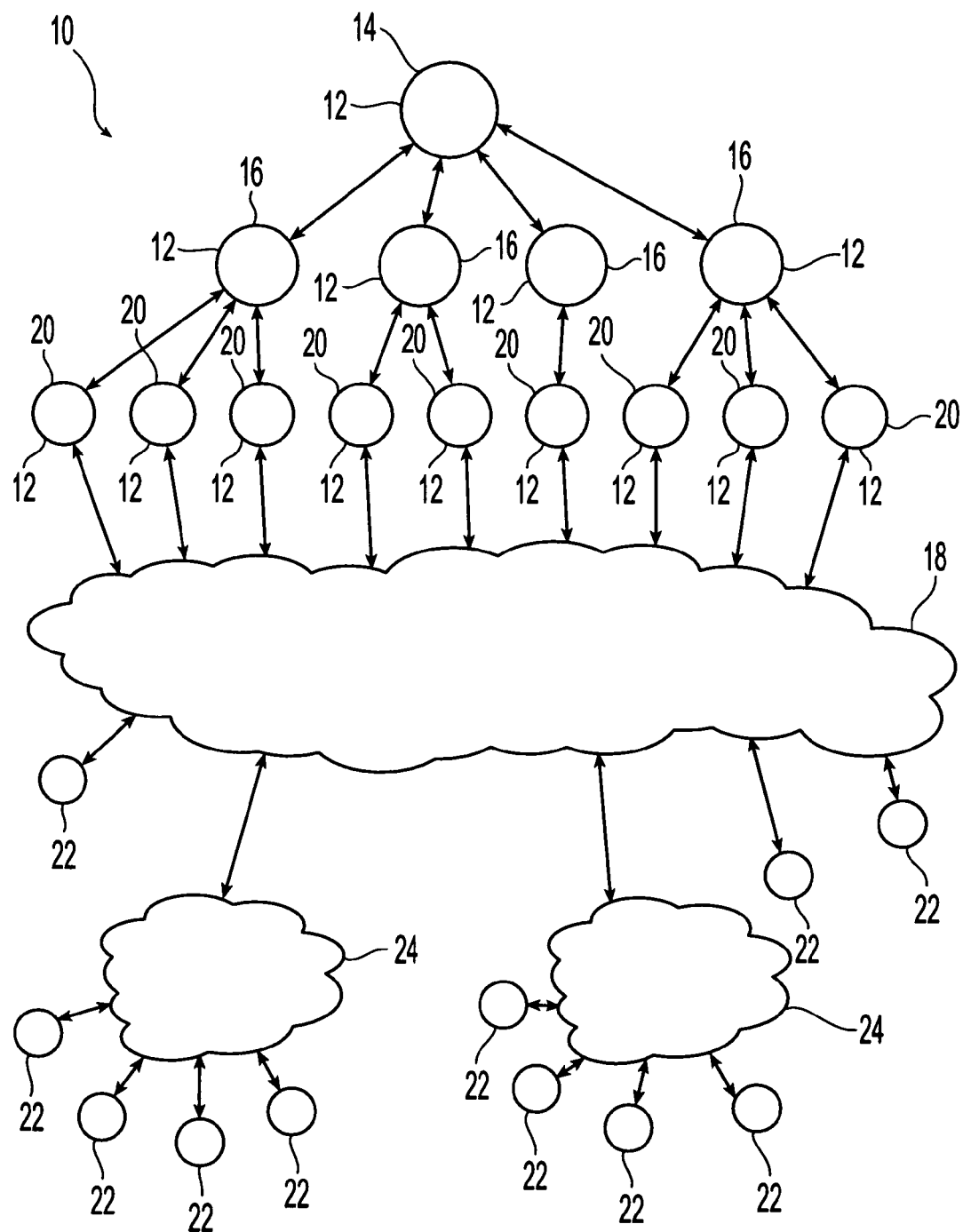
FIG. 1 is a schematic representation of an embodiment of a dedicated server hierarchy and distributed computing system for use with the present invention.

Referring initially to FIG. 1, an exemplary embodiment of a system 10 for use in accordance with the present invention is illustrated. This system includes a plurality of dedicated servers 12 (D-servers) arranged in accordance with a predetermined hierarchy. The dedicated servers are in communication with each other through this hierarchy and can exchange files or data. Suitable servers are known and available in the art and include any type of processor or processing unit capable of processing commands, storing data and communicating with other servers. In one embodiment, each server is a software program that runs on any suitable machine or processor. Therefore, servers or server functionality can be provided by any machine or domain that is willing to host a server. Suitable sources for servers include, but are not limited to resource owners or other volunteering entities. These entities can be referred to as server providers.

Suitable hierarchies into which the dedicated servers can be arranged include, but are not limited to tree and pyramid hierarchies. Preferably, the servers are arranged in a tree hierarchy and include a plurality of leaf node D-servers 20, a plurality of intermediate node D-servers 16 and a root node D-server 14. All of the D-servers can be located in a single location, for example as part of a dedicated server farm. Alternatively, the servers are distributed in various locations and are in communication across one or more networks. For example, each D-server can be located in a separate domain or belong to a different organization. The hierarchy can form through voluntary associations among D-servers. Each D-server, based on which other D-servers it has the most trust in, or communication bandwidth or minimum delay, decides which other D-server to join as its parent. The servers can be strictly dedicated to the hierarchy or can be multi-purposes servers that provide other services or functionalities outside of the hierarchy.

In one embodiment, the entity that provided a given D-server chooses another server, for example either from the same or a different entity, as a parent. Each server usually has at least one parent. In this way servers can organize into a hierarchy. Exactly which server to choose, may involve negotiation between two entities and is up to each entity to determine. Therefore, decisions regarding server arrangements within the hierarchy are made by the various domains or organizations that volunteer or provide these servers and are not made by a centralized entity or third party. In general, a given server does not choose a parent from among its own descendants, thus avoiding loops. In order to prevent the selection of a descendant as a parent, a descendant list is maintained at each server. In one embodiment, parent servers are chosen in an order or arrangement that leads to a balanced hierarchy, improving efficiency. For example, a maximum depth for each server's sub-branches is maintained, and only those servers having greater maximum depths are selected as parents.

The system also includes a plurality of resource discovery servers associated with specific domains or organizations and referred to as O-servers 22. Each O-server can be associated with a separate domain or two or more O-servers can be associated with a common domain. Suitable types of O-servers are the same as for the D-servers. In one embodiment, all of the O-servers are separate and distinct from the D-servers. Alternatively, at least one O-server and one D-server are a common server. In general, the O-servers are arranged as a widely distributed system of servers. Each O-server is in communication with at least one of the D-servers across one or more networks. For example, the distributed O-servers are in communication with the D-servers across a wide area network 18 such as the internet. In addition, other groups of O-servers may also communicate with the D-servers through one or more local area networks 24, for example the local area networks associated with a given domain or internet service provider. As used herein, the communications among the various servers are two-way communications in that each server can transmit and receive data to any other server. In one embodiment, each O-server chooses one D-server to which it will export data. Although each O-server can communicate with any one of the D-servers, preferably, each O-server is identified with and communicated with one of the D-servers that represents a leaf node in the tree hierarchy. Therefore, the O-server becomes a child node of that D-server in the tree hierarchy.

Each O-server can be a single server or a distributed service within the given domain or organization. Each O-server is capable of discovering resources within its organization, of updating stored resource data, of summarizing resource data in accordance with a desired level of granularity, of communicating resource data to other servers and of receiving resource data from other servers. The resource data can be communicated in raw format or in aggregated summary format. The resources contained within a given organization are organized in accordance with the particular or proprietary format of the organization, and the data or attributes describing these resources in that format are obtained and maintained within the O-server. The particular or native format for the attributes used to describe the resources includes the conventions used to name a particular type of resource. Suitable attribute types include, but are not limited to, integer, double, string, timestamp, categorical, blob and combinations thereof. Variations in attribute formats arise from the use of different names to describe the exact same resource, e.g. memory vs. RAM, and the use of different resources having the same basic functionality. For example, one organization may use RAM as its primary storage source and another organization may use flash memory as its primary storage source. Both provide the same basic functionality to their respective organization but would have different attributes to describe the resources. Suitable resources include processing and communication resources that can be allocated to applications and to sensors or other data sources, e.g. video cameras and other surveillance equipment, that provide data that can be utilized by various organizations.

Since each O-server is in communication with and capable of exchanging data with one or more of the distributed dedicated servers, D-servers, contained within the hierarchical structure, each O-server exports the resource attribute data stored on that O-server in accordance with the particular format or protocol of its organization to one of the D-servers.

This D-server is the parent D-server to the O-server. Therefore, the various organizations do not have to be formatted in accordance with a universal format.

A description of any given resource, including the identification, location and capabilities of that resource, is provided using the plurality of attributes that are associated with that resource and are expressed in the resource attribute data. These attributes can take the form of qualitative or quantitative descriptors. In one embodiment, the attributes are provided in quantitative numerical forms such as real or integer numbers, categorical data and numerical intervals, among others. Each attribute associated with a given resource can be thought of as a dimension of the resource to which it is associated. A larger amount of data or attributes correlates to a greater or higher dimensionality. A greater dimensionality requires more storage space to store the associated data. However, except for the O-server associated with the organization in which the resource is located, the entire dimensionality for every resource does not need to be maintained at every server within the hierarchy. In fact, at any given D-server, only a sufficient amount of information is needed to route a query from that D-server in the direction of the O-server containing all of the attribute data for the resource. Therefore, any given D-server only needs a summary or aggregate representation of the attributes for any given resource.

Figure 2:
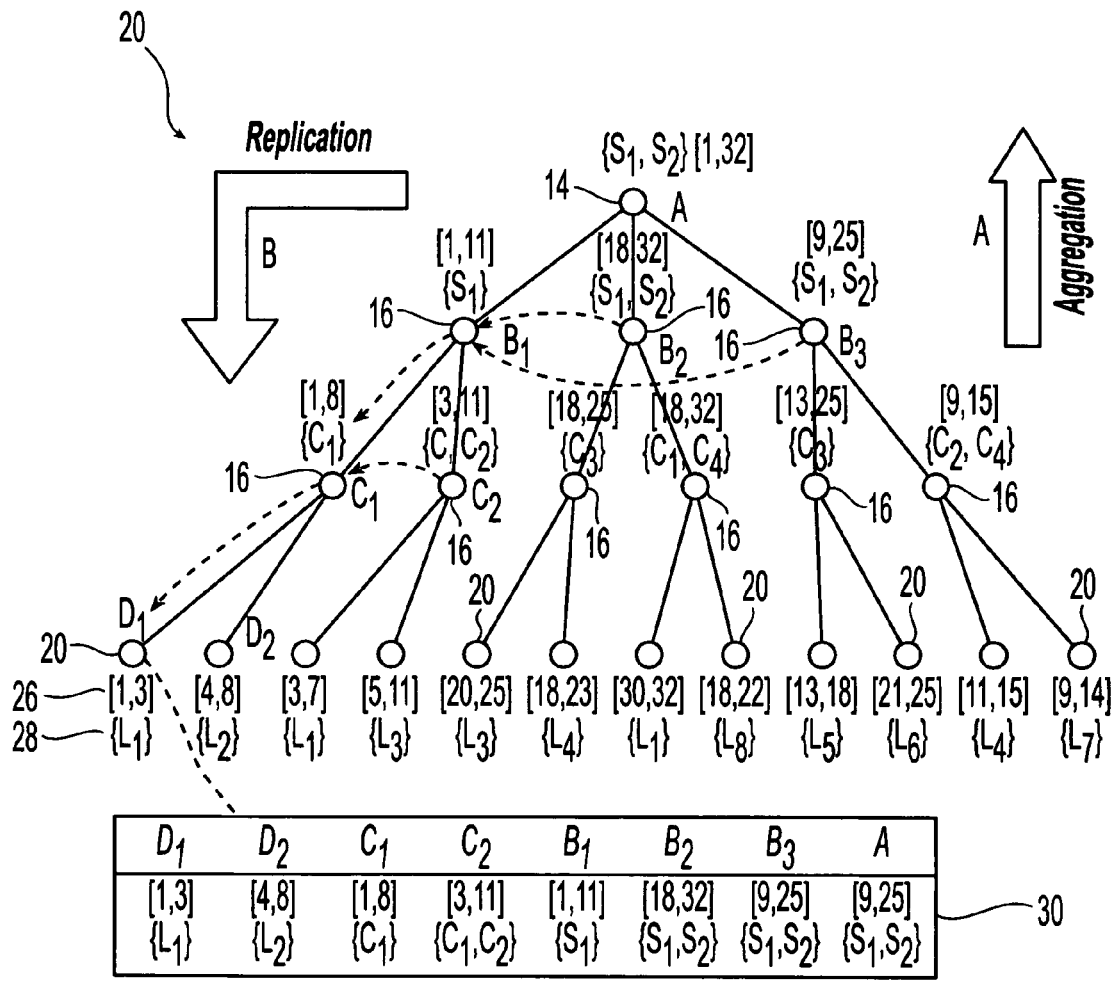
FIG. 2 is a schematic representation of an embodiment of a dedicated server hierarchy for use with the present invention.

Referring to FIG. 2, an exemplary embodiment of a tree hierarchy of D-servers 26 for use in resource discovery and allocation in accordance with the present invention is illustrated in FIG. 2. This tree hierarchy resource discovery system includes a plurality of the individual D-servers including the root D-server 14, the intermediate node D-servers 16 and the leaf node D-servers 20. Each leaf node D-server 20 contains the resource attribute data communicated to it from one or more O-servers. These resource attribute data include quantitative data 26 such as ranges of numbers and qualitative data 28 such as lists or sets of components.

In order to improve the storage of resource attribute data at any given D-server, summaries or aggregations of the resource attribute data associated with the resources and communicated to that D-server are created using aggregation functions. In general, aggregation functions generate summarized data that are of coarser granularity than the original data. This is usually achieved by reducing the amount of data or information associated with a given attribute. In one embodiment, aggregation includes decreasing the amount of data associated with a given attribute. Therefore, for a given attribute, an aggregation function is applied over a set of resources having data associated with that attribute, and aggregation involves aggregation with respect to a given attribute. Suitable aggregation functions include any type of aggregation that reduces data volume while still supporting resource queries. These aggregation functions include, but are not limited to, numeric, either integer or real, single bucket or multi-bucket (histogram) and categorical, i.e. set union. A single aggregation function can be applied to all attributes, or a separate or distinct aggregation function can be used for each attribute. For example, for an attribute, e.g. available bandwidth of network adaptors, that is described using a numerical value, the aggregation result is produced by computing the upper and lower bounds of the attribute for the given set of resources. This aggregation result is communicated to a given D-server. Each aggregated result for that attribute has upper and lower bounds, and aggregated results can be further aggregated. For a given set of aggregated results, all of the acceptable ranges of numerical values for all of the aggregated results will fall within a range defined by the smallest lower bound associated with all of the aggregated results and the largest upper bound associated with all of the aggregated results. Therefore, the aggregated attribute contains the smallest overall lower bound and the largest overall upper bound. A separate attribute for each resource is not maintained at the D-server. Only the aggregate attribute containing the overall upper and lower bounds. This aggregate attribute is communicated upwards through the hierarchy of D-servers and ultimately the root D-server. The D-server in the hierarchy that receives the aggregated attribute obtains a grainier or broader view of the resources below it in terms of that attribute. That D-server may not know the exact value associated with an attribute of any resource, but the D-server will know that any resource associated with its children nodes has for that attribute values that fall within the upper and lower bounds of its aggregated attribute. When a given D-server, for example one of the intermediate D-servers, receives the aggregated attribute data from its children, that D-server further aggregates the data along each dimension. Again, for a quantitative or numerical attribute, the D-server takes the smallest of all lower bounds and greatest of all upper bounds, thus obtaining the new lower and upper bounds. This further aggregated attribute is communicated to the parent of that D-server. This process is repeated from D-server to D-server until the root server in the hierarchy is reached.

For a categorical attribute 28, a set or list is used to represent the members or categories included in the attribute. For example, the attribute can be an identification of the types of communication protocols that a given resource can support, and the attribute is represented by a set containing an identification of the supported communication protocols. Aggregation includes taking a combination or union of all the attribute sets associated with the resources and received from an O-server or a child D-server. Attribute sets representing the union of all sets are communicated up through the hierarchy, being further aggregated or combined at each level. As shown in FIG. 2, aggregation repeats at each server, from the leaf node D-servers 20 at the bottom up to the root D-server 14 at the top. The root D-server maintains a superset that contains an identification of all the categories for the attribute for all available resources. The root D-server receives and aggregates the attribute data for all resources discovered and available for allocation to one or more resource demands such as an application running in a given computing system. Although lower and upper bound and set union aggregation functions were used in the examples, other forms of aggregation functions can be used as well, as long as the aggregation function reduces the data size and assists in directing the search towards available resources.

In one embodiment, an aggregation function is suitable for use with location attributes, e.g. street address, city, county, state. For example, at the level of the leaf node level D-servers, the location attribute contains a sufficient amount of information to describe or circumscribe a city block sized rectangle in which a given resource, e.g. a video camera, is located. As illustrated in FIG. 2, the set of locations at each leaf node D-server is given in a set of locations $\{L\}$, which could give as much detail as exact street address or exact map grid. As the location attribute is aggregated and communicated to intermediate D-servers 16 the amount of detail provided in the location information is given with decreased specificity, e.g. city name $\{C\}$ and state name $\{S\}$. The city name set contains all of the cities contained in all the location attribute sets communicated to that intermediate D-server from its children. At the root D-server level, the location attribute would only specify that all resources are located within a given state.

In general, the process of aggregation is utilized in the communication of attribute data up through the hierarchy as indication by the direction of arrow A. Replication is used to communicate the aggregated data down through the hierarchy to the leaf node D-servers or intermediate D-servers as indicated by arrow B. Replication is used to communicate more information throughout the entire structure of the hierarchy to make responding to queries more efficient. In one embodiment, the summarized data of a given D-server's siblings, that D-server's ancestors' siblings, and the D-server's ancestors if they themselves have data, are periodically sent top-down in the hierarchy from that D-server to a recipient D-server and cached by the receiving D-server. For example as illustrated in the expanded list 30 in FIG. 2, a given leaf node D-server $D_1$ contains its own aggregated resource attribute data and the replicated aggregated resource data of leaf node D-server $D_2$, which is its sibling, intermediate D-server $C_1$, it parent, intermediate D-server $C_2$, its parent's sibling, intermediate D-server $B_1$, its grandparent, intermediate D-servers $B_2$ and $B_3$, its grandparent's siblings, and root D-server A. Therefore, sufficient information about all of the resource allocation data submitted to the hierarchy of D-servers is maintained at a single leaf node within the hierarchy such that resource allocation queries can be received and processed at that leaf node without having to communicate that query to the root D-server for processing. That is, the leaf nodes have a sufficiently detailed picture of all available or identified resources.

Therefore, each server forwards its summarized and aggregated data up through the hierarchy and propagates the aggregated data of servers located upstream in the hierarchy down through the hierarchy towards the leaf nodes. For example, D-server node $B_1$ receives the aggregated attribute data of D-servers $B_2$ and $B_3$ from root D-server A and forwards this aggregated attribute data to both D-servers $C_1$ and $C_2$. D-servers $C_1$ and $C_2$ upon receipt of the aggregated attribute data continue its propagation down the hierarchy towards the leaf level servers.

Using replication to communicate resource information among the various D-servers within the hierarchy, each D-server contains the summary or aggregate copy of at least a portion and potentially the entire set of global resources, speeding up resource discovery and query times. In general, the amount of detail that a given D-server has about any particular resource is proportional to the distance, e.g. the number of intermediate node D-servers and O-servers, between that D-server and the resource. For shorter distances between the D-server and the resource, a higher degree of specificity or detail is maintained in that D-server about the resource. As the distance grows, the D-server will still maintain information about the resource, but at much coarser granularity. For example, D-server node $D_1$ knows the locations of camera records stored at D-server node $D_2$ at a city block level of specificity; however, D-server node $D_1$ only knows the locations of camera records for D-server nodes $B_2$ and $B_3$ at a state level of specificity. Reducing the level of specificity and increasing the granularity with distance ensures that the total storage and message overhead does not become exceedingly large. In one embodiment, for a node degree of k in a hierarchy containing n servers, the storage complexity is about k log n at each server.

Figure 3:
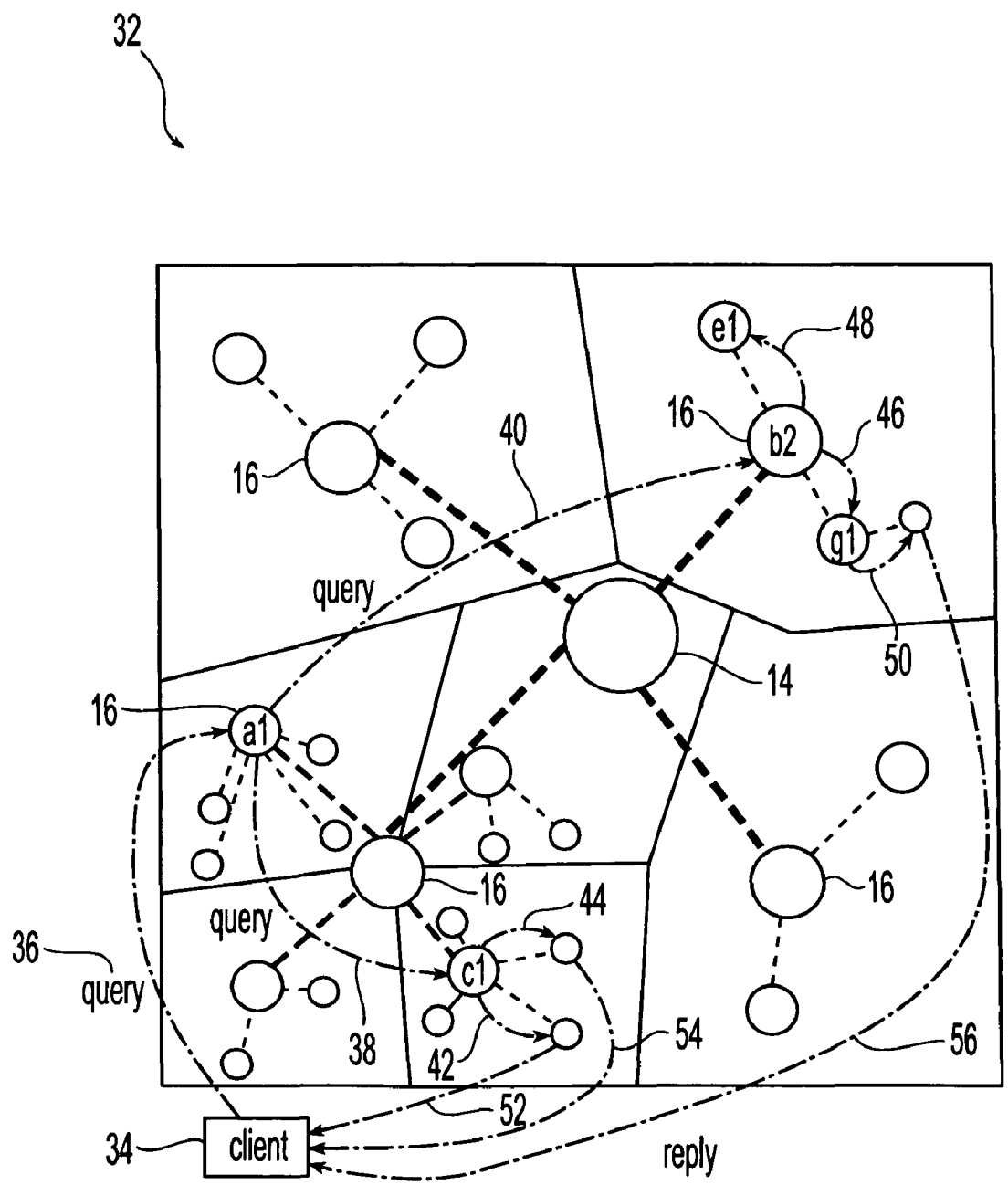
FIG. 3 is a schematic representation illustrating an embodiment of query processing in accordance with the present invention.

Replication also allows queries to be sent to any D-server within the hierarchy and not just the root D-server. Referring to FIG. 3, an exemplary embodiment illustrating the processing of resource queries using a given hierarchy of D-servers is shown. A client 34 submits a query 36 to one of the D-servers a1 in the hierarchy. This D-server a1 searches the summarized or aggregate data stored at that D-server, including is own summarized data and any replicated data that has been communicated to it. Based upon this search, the D-server a1 determines that its sibling D-server c1 and its uncle D-server b2 contain information about the resources required by the query. D-server a1 forwards the query 38, 40 to it sibling and uncle D-servers c1 and b2. These D-servers c1 and b2 then search through the data of their D-servers children, forwarding the query to those children D-servers possessing relevant resource information 46, 48. The process of searching for resource attribute data in subsequent children is repeated to route the query to one or more of the O-servers 42, 44, 50. The O-servers are children nodes of the leaf node D-servers in the tree hierarchy. Each O-server, in response to the query, searches its own database for the detailed resource records and returns the results to the client 52, 54, 56. As illustrated, the initial query 34 was not submitted or forwarded to the root D-server 14, but was submitted to an intermediate node D-server. From that point, the query was processed and forwarded to the O-servers, that is the domains or computer systems, containing the resources responsive to the query.

In addition to decreasing response time, replication improves the robustness or resiliency of the hierarchy system, for example when faced with the failure of one or more of the D-servers including the root D-server. If the root D-server 14 fails or crashes, queries submitted to the hierarchy can still be processed and answered by the remaining available D-servers. In one embodiment, each D-server within the hierarchy maintains periodic "heart-beat" messages along each communication link with its children servers and parent server. These heart-beat messages test the availability of the communication link and the server. If a given heart-beat message indicates that a server or communication link, for example associated with the parent D-server, is not accessible, the D-server chooses an uncle D-server as its new parent. This choice can be made randomly or in accordance with one or more pre-determined selection criteria. If the parent D-server is the root D-server of the hierarchy system, one of the children is elected as the new root. Suitable methods for the selection of a new root include, but are not limited to, selecting the child D-server having the smallest IP address, considering the current load on each child D-server and combinations thereof. In general, eliminating the need to submit or forward every query to a single root D-server alleviates the associated bottleneck and distributes the computation load throughout the hierarchy, reducing query response times.

Additional robustness is provided to the hierarchy system by ensuring that the aggregated or summarized data stored at any given D-server is as up-to-date as possible and accurately represents the current state of available resources including resources that are not currently available and resources that have been recently added. In one embodiment, the summarized data are soft-state. For example, each D-server maintains a time-to-live (TTL) value for each dimension of the summarized data. In general, the data are refreshed periodically as new data are received from children or parents. As long as refreshed data are received in compliance with the prescribed TTL values, the summarized data is maintained as current and reliable. However, when a resource is removed or a child D-server goes off-line, refreshed data will not be received within the constraints set by the TTL values. Therefore, the summary data associated with these are removed from a given D-server when those data expire in accordance with the TTL values. Therefore, outdated data, changes to the hierarchy topology and changes in the available resources do not interfere with or corrupt resource discovery in response to the queries.

In general, the process of replication incurs overhead as storage, processor and communication resources are consumed. Therefore, methods are used to minimize the impact of this overhead on overall system performance and resource allocation while preserving the desired level of updating in the replicated data. In one embodiment, a distributed algorithm is used that sets the optimal update period for each link. A description of an embodiment of this algorithm is found in a co-pending U.S. patent application Ser. No. 11/493,373 titled "A distributed algorithm for minimum overhead replication in a tree hierarchy subject to consistency constraints".

Additions and corrections, in addition to losses, to the hierarchy topology and to the collection of available resources are also taken into account. For example, a given D-server will rejoin a reformatted hierarchy topology following the loss of its previous parent D-server and its subsequent re-connection with its new parent D-server. Upon connection with the new parent D-server, the child D-server forwards is aggregated or summarized data to the new parent.

In one embodiment, data replication is carried through to the last leaf D-server nodes; however, the O-servers are not involved in the replication of any data. The O-servers only export their data in suitable form, for example a summarized or aggregate form, that can be understood by the D-servers. Various methods, including periodic or automated methods are used to forward the O-server data to the D-servers. Forwarding of the data can be initiated by either the O-servers or in response to queries from the D-servers. In one embodiment, routines that are integrated into the D-server or O-server or operate separate from either server and that run automatically in the background out of the direct control of a system administrator, e.g., a wrapper daemon, are used to forward data updates from the O-servers to the D-servers. In one embodiment, the routines periodically query a given O-server, extract the desired summarized data and forward the extracted data to the parent D-server. In addition to merely providing retrieval and forwarding, the routine can also reformat the results returned by a search of the O-server into a common format understood by the client.

The hierarchy of D-servers is not limited to using any particular attribute format to monitor and administer the allocation of resources that are contained in a variety of different organizations or domains. In addition, there is not universal or standardized attribute format for resource identification that is imposed on the distributed computing systems. Each computing systems determines and utilizes its own attribute format. Therefore, the schemas, i.e. the list of attributes, used for each type of resource, do not need to be exactly the same within different organizations. The D-servers at the leaf level can map the attributes about a given type of resource received from a variety of O-servers to one or more common attributes used among the D-servers in the hierarchy, even if the various received attributes are different. In one embodiment, one or more of the D-servers, for example the lead node D-servers communicate to the O-servers a pre-determined common attribute format that is to be used for the resource attribute data in the hierarchy. The communicated common attributes contain a sufficient amount of information to allow each O-server to map the resource data attributes for its resources to the common attributes. This map is communication to the D-servers along with the resource attribute data. Therefore, each autonomous organization has an increased amount of freedom in choosing its native resource discovery system, and the federated hierarchy system can incorporate a wider variety of legacy autonomous systems. No external attribute format or hierarchy is imposed on the individual computing systems.

In one exemplary embodiment of a method for federated resource discovery in distributed systems in accordance with the present invention, resource attribute data associated with a plurality of resources disposed in a plurality of distributed computing systems is communicated from those distributed computing systems to one or more of a plurality of dedicated servers arranged in accordance with a pre-defined hierarchy. In general, the resource attribute data contain a sufficient amount of data about the resources contained in the distributed computing systems to facilitate identification and allocation of the associated resources disposed within the plurality of distributed computing systems. The resources are identified and allocated in response to resource demand queries from clients, for example applications running on one of the servers in the computing systems or within the hierarchy. Suitable computing systems including any arrangement or networked arrangement of computing resources including, but not limited to, an information technology (IT) computing system.

In one embodiment, in order to communicate the resource attribute data to the D-servers, the resource data is actively obtained from each computing system using the D-servers. Alternatively, the O-servers disposed within the plurality of computing systems obtain the resource attribute data for the resources contained within the computing system in which the O-server is located. In one embodiment, each computing system contains two or more O-servers that are used to obtained resource attribute data. Preferably, each computing contains one O-server for resource attribute data acquisition and communication. The resource attribute data can be communicated to any D-server within the hierarchy. Preferably, for a leaf hierarchy, the resource attribute data are communicated to one of the leaf node D-servers contained within the hierarchy. In one embodiment, a suitable leaf node D-server is identified for each O-server, and the O-servers communicate the resource attribute data to the associated leaf node D-servers.

Each O-server or resource discovery server obtains the resource attribute data for the resources contained within its computing system in the native attribute format for that computing system. For a plurality of computing systems, a plurality of native attribute formats is possible, and each format can be unique. These native formats vary the way resources are accounted for and described including, but not limited to, the name assigned to a particular resource and the types of resources utilized for a given function within the computing system. Each native attribute format for each computing system is determined by and associated with one of the distributed computing systems. A generic or universal attribute format is not imposed upon the various computing systems. Instead, the communicated resource attribute data is mapped, at the D-server level, from the plurality of native attribute formats to a common attribute format. This common attribute format is provided by at least one of the plurality of dedicated servers. Mapping between the common format and the native formats can be conducted at the D-server level or at the O-server level. In one embodiment, the common attribute format is communicated to each one of the O-servers, and the O-servers in communicating the resource attribute data to the D-servers map the communicated resource attribute data from the plurality of native formats to a common attribute format provided by the D-servers. Therefore, both the mapping information in conjunction with the resource attribute data is communicated to the D-servers.

Having communicated the resource attribute data for all of the currently available resources within the distributed computing systems to the D-servers within the hierarchy, a sufficient amount of resource attribute data is maintained at any given dedicated server within the hierarchy of dedicated servers. Therefore, resource queries can be submitted to and processed by any D-server, and these D-servers can route those queries through the hierarchy of dedicated servers to the appropriate distributed computing system or to the appropriate O-server within the computing system that contains a suitable resource for the query. Maintenance of the desired amount of resource attribute data at each D-server is accomplished using aggregation and replication. In one embodiment, the resource attribute data are aggregated at each D-server to which the resource attribute data are communicated from the plurality of computing systems. These aggregated resource attribute data are communicated through one or more intermediate D-servers to a root D-server of the hierarchy. In addition to aggregating the resource attribute data at the leaf node D-servers, the resource attribute data are further aggregated at each one of the intermediate dedicated servers as the data are communicated upward through the hierarchy.

In one embodiment, the resource attribute data maintained at each dedicated server within the hierarchy are replicated at one or more additional dedicated servers within the hierarchy, for example siblings and ancestors within the hierarchy. Since the status and availability of any given resource, i.e. the resource attribute data associated with that resource changes over time, the resource attribute data maintained in the D-servers are periodically updated. For example, a time to live value is identified for each resource attribute datum communicated to the dedicated servers. This is the prescribed conditions or period of time in which an update has to be received or that datum expires. Resource attribute data are deleted from the dedicated servers when updates are not received in compliance with the identified time to live values.

In one embodiment, a request, i.e. a resource request, is sent to one of the D-servers within the hierarchy, including leaf node D-servers, intermediate D-servers and root node D-servers. Suitable queries include structured query language (SQL) select queries. Since each node contains aggregated and replicated data, the query can be forwarded to other node D-servers within the hierarchy and can even be forwarded across relatively long jumps between servers and not just to adjacent, i.e. parent-child, D-servers. The recipient D-server, in response to the query, can return matching records to the query source, i.e. a user, or can forward the query to other D-servers within the hierarchy. Ultimately, the query is forwarded to one or multiple servers that can return resource records in response to the query. In one embodiment, one or more D-servers map queries from the native format of the query to the common query format used within the hierarchy. Preferably this mapping or translation is handled at the D-server level. In one embodiment, the query formats are communicated to the D-servers for example from O-servers or other query sources. The D-server creates the necessary mapping relationships so that in response to the receipt of a given query in native format, that query can be mapped to the common query format utilized by the hierarchy for processing by the hierarchy of D-servers.

In one embodiment, a resolver module can act on behalf of the client to send queries and receive results. The resolver can relieve the client from the burden of interacting with the D-server hierarchy and the O-servers. Since the client might be an external application that does not know the native formats of results returned from the O-servers, which may vary from one organization to another, the resolver can do appropriate formatting and return to the client results in a universal format.

In one embodiment, client queries are handled in as an iterative process, i.e. each server redirects the client to query other servers. Preferably, client queries are not handled in a recursive manner where servers forward the query and relay the results back to the client. Using the iterative process allows the client to stop the search when needed. For example, the client may not need an exhaustive search in response to its query and can stop the query process when the record of the first qualifying resource is received or when a sufficient number or records are received. In the recursive mode, it is difficult for the client to notify servers and stop the search. Using the iterative mode shifts the complexity and responsibility to the client, and the client is at a better position to make stop decisions.

Systems and methods in accordance with the present invention can be used in a variety of applications with a variety of arrangements of distributed organizations. Suitable applications include, but are not limited to, internet-based stream processing systems and resource rich sensor and actuator networks. In these systems, the present invention unifies previously isolated and potentially application specific networks and resources, while supporting applications that run across multiple networks. In addition, exemplary methods and systems in accordance with the present invention can be used in conjunction with enterprise directory services to provide unified access to directory services developed and deployed separately and to grid computing systems by unifying multiple grids that each potentially employs a different directory service.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for federated resource discovery in distributed information technology systems in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for federated resource discovery in distributed systems, the method comprising:
    establishing a federated resource discovery architecture comprising a plurality of dedicated servers arranged in a hierarchy and a plurality of resources discovery servers, the dedicated servers separate from the resource discover servers and each resource discovery server disposed in one of a plurality of distributed autonomous domains and in communication with one of the dedicated servers;
    communicating resource attribute data associated with a plurality of resources disposed in the plurality of distributed autonomous domains from each one of the resource discovery servers disposed in the distributed autonomous domains to one of the dedicated servers in the hierarchy of dedicated servers, the resource attribute data sufficient to facilitate identification and allocation of the associated resources disposed within the plurality of distributed autonomous domains;
    maintaining a sufficient amount of resource attribute data communicated from the resource discovery servers at each dedicated server within the hierarchy of dedicated servers such that each dedicated server is arranged to receive user queries about resources contained in the autonomous domains, to process these resource queries internally using only the resource attribute data maintained at that dedicated server to identify other dedicated servers that maintain attribute data responsive to the received user query and to forward the received user queries directly from that dedicated server to the other dedicated servers for routing through the hierarchy of dedicated servers to appropriate resource discovery servers within distributed autonomous domains that comprise resources responsive to the received user queries, wherein the sufficient amount of resource attribute data at each dedicated server comprises summarized data maintained at sibling nodes and ancestor sibling nodes of that dedicated server.

2. The method of claim 1, further comprising obtaining the resource attribute data in a plurality of native attribute formats, each native attribute format determined by and associated with one of the distributed autonomous domains.

3. The method of claim 2, wherein the step of communicating the resource attribute data further comprises mapping the communicated resource attribute data from the plurality of native attribute formats to a common attribute format provided by at least one of the plurality of dedicated servers.

4. The method of claim 1, wherein:
    the method further comprises communicating to each one of the resource discovery servers a common attribute format; and
    the step of communicating the resource attribute data further comprises:
    using at least one, of the dedicated servers and the resource discovery servers to map the communicated resource attribute data from the plurality of native formats to a common attribute format provided by at least one of the plurality of dedicated servers; and
    communicating this mapping to one of the dedicated servers in conjunction with the resource attribute data.

5. The method of claim 1, wherein the step of maintaining a sufficient amount of resource attribute data further comprises aggregating the resource attribute data at each dedicated server to which the resource attribute data are communicated from the plurality of distributed autonomous domains and communicating the aggregated resource data through one or more intermediate dedicated servers to a root dedicated server of the hierarchy.

6. The method of claim 5, further comprising aggregating the resource data at each one of the intermediate dedicated servers.

7. The method of claim 1, wherein the step of maintaining a sufficient amount of resource attribute data further comprises replicating the resource attribute data maintained at each dedicated server within the hierarchy at one or more additional dedicated servers within the hierarchy.

8. The method of claim 1, wherein the pre-determined hierarchy comprises a tree hierarchy.

9. The method of claim 8, wherein the step of communicating the resource attribute data further comprises communicating the resource attribute data from the plurality of resource discovery servers to each one of a plurality of leaf node dedicated servers within the tree hierarchy.

10. The method of claim 1, wherein the step of maintaining a sufficient amount of resource attribute data further comprises periodically updating the resource attribute data maintained in the dedicated servers.

11. The method of claim 1, wherein the step of maintaining a sufficient amount of resource attribute data further comprises:
    identifying a time to live value for each resource attribute datum communicated to the dedicated servers; and
    deleting resource attribute data from the dedicated servers for which updates are not received in compliance with the identified time to live values.

12. A computer-readable storage medium storing a computer-readable code that when read by a computer causes the computer to perform a method for federated resource discovery in distributed systems, the method comprising:

establishing a federated resource discovery architecture comprising a plurality of dedicated servers arranged in a hierarchy and a plurality of resources discovery servers, the dedicated servers separate from the resource discover servers and each resource discovery server disposed in one of a plurality of distributed autonomous domains and in communication with one of the dedicated servers;

communicating resource attribute data associated with a plurality of resources disposed in the plurality of distributed autonomous domains from each one of the resource discovery servers disposed in the distributed autonomous domains to one of the dedicated servers in the hierarchy of dedicated servers, the resource attribute data sufficient to facilitate identification and allocation of the associated resources disposed within the plurality of distributed autonomous domains;

maintaining a sufficient amount of resource attribute data communicated from the resource discovery servers at each dedicated server within the hierarchy of dedicated servers such that each dedicated server is arranged to receive user queries about resources contained in the autonomous domains, to process these resource queries internally using only the resource attribute data maintained at that dedicated server to identify other dedicated servers that maintain attribute data responsive to the received user query and to forward the received user queries directly from that dedicated server to the other dedicated servers for routing through the hierarchy of dedicated servers to appropriate resource discovery servers within distributed autonomous domains that comprise resources responsive to the received user queries, wherein the sufficient amount of resource attribute data at each dedicated server comprises summarized, data maintained at sibling nodes and ancestor sibling nodes of that dedicated server.

13. The computer readable storage medium of claim 12, wherein the method further comprises obtaining the resource attribute data in a plurality of native attribute formats, each native attribute format determined by and associated with one of the distributed autonomous domains.

14. The computer readable storage medium of claim 13, wherein the step of communicating the resource attribute data further comprises mapping the communicated resource attribute data from the plurality of native attribute formats to a common attribute format provided by at least one of the plurality of dedicated servers.

15. The computer readable storage medium of claim 12, wherein:

the method further comprises communicating to each one of the resource discovery servers a common attribute format; and the step of communicating the resource attribute data further comprises:

using at least one of the dedicated servers and the resource discovery servers to map the communicated resource attribute data from the plurality of native formats to a common attribute format provided by at least one of the plurality of dedicated servers; and communicating this mapping to one of the dedicated servers in conjunction with the resource attribute data.

16. The computer readable storage medium of claim 12, wherein the step of maintaining a sufficient amount of resource attribute data further comprises aggregating the resource attribute data at each dedicated server to which the resource attribute data are communicated from the plurality of distributed autonomous domains and communicating the aggregated resource data through one or more intermediate dedicated servers to a root dedicated server of the hierarchy.

17. The computer readable storage medium of claim 12, wherein the step of maintaining a sufficient amount of resource attribute data further comprises replicating the resource attribute data maintained at each dedicated server within the hierarchy at one or more additional dedicated servers within the hierarchy.

18. The computer readable storage medium of claim 12, wherein the pre-determined hierarchy comprises a tree hierarchy.

* * * * *